United States Patent [19]

Okada

[11] Patent Number: 5,502,484
[45] Date of Patent: Mar. 26, 1996

[54] VIDEO CAMERA AND VIDEO SIGNAL REPRODUCING APPARATUS WITH SHAKE DETECTION AND CORRECTION OPERATION

[75] Inventor: Miyuki Okada, Kanagawa, Japan

[73] Assignee: Sony Corporation, Tokyo, Japan

[21] Appl. No.: 502,584

[22] Filed: Jul. 14, 1995

Related U.S. Application Data

[63] Continuation of Ser. No. 187,058, Jan. 27, 1994, abandoned.

[30] Foreign Application Priority Data

Feb. 12, 1993 [JP] Japan ................................. 5-047434
Feb. 16, 1993 [JP] Japan ................................. 5-050029

[51] Int. Cl.$^6$ ................................................ H04N 5/232
[52] U.S. Cl. ........................................ 348/208; 348/240
[58] Field of Search ................................ 348/208, 240, 348/358, 347; H04N 5/232

[56] References Cited

U.S. PATENT DOCUMENTS

| | | | |
|---|---|---|---|
| 4,843,475 | 6/1989 | Imai ........................................ | 348/358 |
| 5,060,074 | 10/1991 | Kinugasa et al. ........................ | 348/208 |
| 5,128,768 | 7/1992 | Suda et al. ............................. | 348/350 X |
| 5,166,723 | 11/1992 | Yoshida et al. ......................... | 354/430 |
| 5,170,255 | 12/1992 | Yamada et al. ......................... | 348/208 |
| 5,172,226 | 12/1992 | Morimura et al. ...................... | 348/208 |
| 5,384,595 | 1/1995 | Sakaguchi ............................... | 348/208 |

FOREIGN PATENT DOCUMENTS

| | | | |
|---|---|---|---|
| 0401858 | 12/1990 | European Pat. Off. . | |
| 4086162 | 3/1992 | Japan ......................... | H04N 5/232 |
| 2162019 | 1/1986 | United Kingdom . | |

OTHER PUBLICATIONS

Patent Abstracts of Japan, vol. 14, No. 576.
Patent Abstracts of Japan, vol. 15, No. 319.
Patent Abstracts of Japan, vol. 15, No. 242.
Funkschau, vol. 63, No. 9, 19 Apr. 1991.

*Primary Examiner*—Wendy R. Greening
*Attorney, Agent, or Firm*—Jay H. Maioli

[57] ABSTRACT

A video camera includes a lens for collecting a light from an object to be photographed; an image pickup device for converting the light collected by the lens into an electric signal; an analog to digital converting circuit for converting the electric signal from the image pickup device into a digital signal; a memory circuit for storing the digital signal obtained by the analog to digital conversion; a shake detector for detecting a shake of the video camera; calculating unit for obtaining a correction amount from an output signal of the shake detector; a correcting unit for correcting a shake of an image accompanied with a slight shake of a body of the video camera on the basis of an output signal of the calculating means; a zoom system for enlarging or reducing the object to be photographed; and a control unit for changing the correcting unit in accordance with a change of zoom of the zoom system.

29 Claims, 9 Drawing Sheets

VIDEO CAMERA AND VIDEO SIGNAL REPRODUCING APPARATUS WITH SHAKE DETECTION AND CORRECTION OPERATION

This is a continuation of application Ser. No. 08/187,058 filed Jan. 27, 1994 now abandoned.

BACKGROUND OF THE INVENTION

1. Field of the Invention

The present invention relates to a video camera and a video signal reproducing apparatus, each having a hand shake correcting function.

2. Description of the Related Art

In recent years, in association with the miniaturization and light weight of video cameras, a problem of hand shake has come to easily occur. Therefore, a video camera having a hand shake correcting function has been put into practical use.

As a hand shake correcting method of such a video camera, there has been known a method whereby a shake of the camera is detected by an angular velocity sensor and a cut-out position in an image memory is shifted in accordance with an output of the angular velocity sensor.

In such a hand shake correcting method of the video camera, the output of the angular velocity sensor is integrated by a low pass filter, and is converted from an angular velocity into an angle, thereby obtaining a correction amount. On the basis of the correction amount, an image plane is shifted. A limiter to set a correction limit value of an output of the low pass filter is provided so that the correction amount does not exceed the limit value.

The video camera having the image memory can enlargedly interpolate the image plane stored in the image memory. Such a function is called an electronic zoom. On the other hand, a zoom in which a zoom lens is moved is called an optical zoom.

In case of the hand shake correcting method such that a movement of the camera is detected by the angular velocity sensor and the correction is performed in accordance with the cut-out position in the image memory (for example, European Patent Application Publication No. 0498730), the shake of the image plane enhances with an increase in zoom magnification in the optical zoom region. It is, therefore, necessary to increase the correction amount in proportion to the zoom magnification.

On the other hand, in an electronic zoom region, it is sufficient to set the correction gain constant. This is because in the electronic zoom region, for example, in case of the electronic zoom of the double magnification, when there is a hand shake of (n) lines, the reading position in the image memory is shifted by (n) lines. Then, the content of the image memory is interpolated by two times and is read out. When the image data is shifted by (n) lines and is interpolated by two times and is read out, the correction of (2n) lines is executed.

Such a hand shake correcting apparatus has a low pass filter to convert from an angular velocity based on the shake of the camera detected by the angular velocity sensor into an angle. Since it is sufficient that the correction gain is constant in the electronic zoom region, hitherto, the gain of the low pass filter is set to the same as that in the control in the telescopic end of the zoom lens in the electronic zoom region.

However, when such a hand shake correcting function is added, a problem such that an image pickup plane becomes unnatural upon panning photographing has conventionally occurred. Namely, upon panning photographing, the camera is suddenly moved at the start of the panning. Due to this, the integration value of the angular velocity sensor rapidly increases and suddenly the value exceeds the correction limit. Accordingly, the image pickup plane becomes unnatural.

Figure 13A:
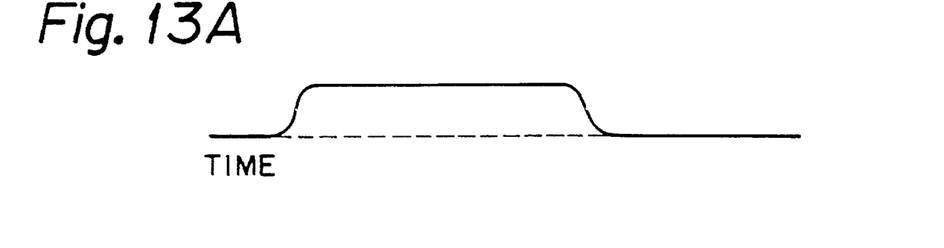
FIGS. 13A, 13B, and 13C are waveform diagrams which are used for explanation of conventional limiter.
Figure 13B:
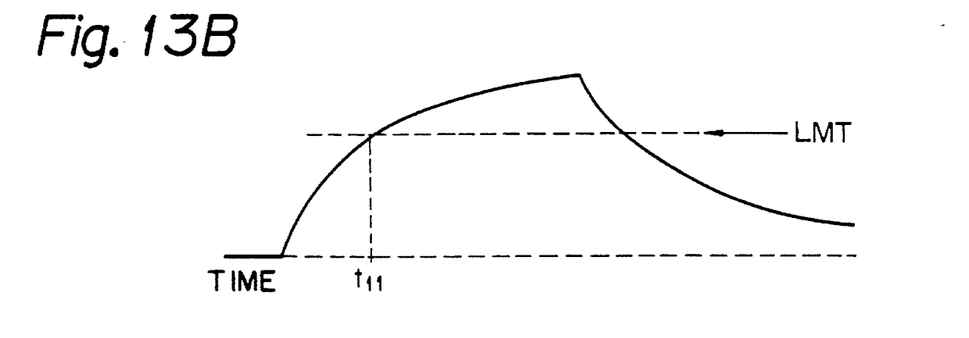
Figure 13C:
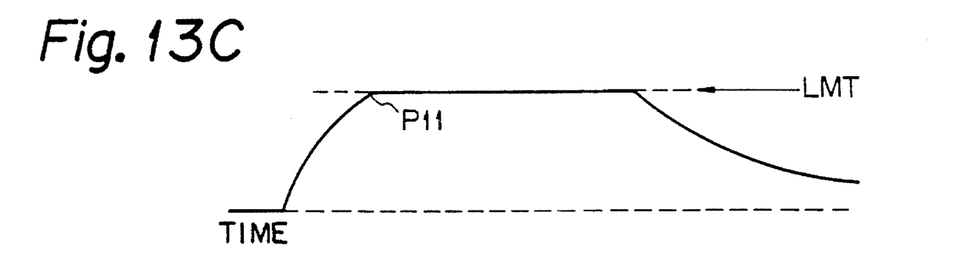

Namely, when the panning photographing is executed, a detection signal is outputted from the angular velocity sensor as shown in FIG. 13A. The detection signal is integrated by a low pass filter. The integration value reaches a correction limit LMT at a time point $t_{11}$ as shown in FIG. 13B. Hitherto, as shown in FIG. 13C, the integration value is suddenly limited from a point P11 at the time point $t_{11}$ at which the integration value reaches the correction limit LMT.

On the other hand, when the electronic zoom magnification rises, the portion which is not read out from the image memory is widened, so that the hand shake correction ability inherently increases. However, conventionally, the low pass filter which integrates the output of the angular velocity sensor is controlled in a manner similar to the control in the telescopic end of the zoom lens in the electronic zoom region. Therefore, the hand shake correcting function cannot be effectively utilized even at a position of a high electronic zoom magnification where the hand shake correction ability is high.

OBJECTS AND SUMMARY OF THE INVENTION

Therefore, it is an object of the invention to provide a video camera and a video signal reproducing apparatus which can prevent an unnatural movement of an image plane upon panning photographing.

It is another object of the invention to provide a video camera and a video signal reproducing apparatus, in which the correction amount in the electronic zoom region can be effectively used and the correction ability is improved.

According to an aspect of the invention, there is provided a video camera comprising:

- a lens for collecting a light from an object to be photographed;
- an image pickup device for converting the light collected by the lens into an electric signal;
- an analog to digital converting circuit for converting the electric signal from the image pickup device into a digital signal;
- a memory circuit for storing the digital signal obtained by the analog to digital conversion;
- shake detecting means for detecting a shake of the video camera;
- calculating means for obtaining a correction amount from an output signal of the shake detecting means;
- correcting means for correcting a shake of an image accompanied with a slight shake of a body of the video camera on the basis of an output signal of the calculating means; and
- a limiter circuit for limiting a correction amount in the correction limit for an output signal of the calculating means.

According to another aspect of the invention, there is provided a video signal reproducing apparatus comprising:

an analog to digital converting circuit for converting an input video signal into a digital signal;

a memory circuit for storing the digital signal obtained by the analog to digital conversion;

shake detecting means for detecting a shake of an image plane generated by the video signal;

calculating means for obtaining a correction amount from an output signal of the shake detecting means;

correcting means for correcting a shake of an image accompanied with a slight shake of a body of the video camera on the basis of an output signal of the calculating means; and a limiter circuit for limiting a correction amount in the correction limit for an output signal of the calculating means.

The shake of the video camera or the video signal reproducing apparatus is detected and integrated, thereby obtaining a control amount. A limiter which sets a limit value in the control is set to a nonlinear limiter, thereby limiting that the value suddenly reaches the correction limit upon panning and making an image plane upon panning natural.

According to still another object of the invention, there is provided a video camera comprising:

a lens for collecting a light from an object to be photographed;

an image pickup device for converting the light collected by the lens into an electric signal;

an analog to digital converting circuit for converting the electric signal from the image pickup device into a digital signal;

a memory circuit for storing the digital signal obtained by the analog to digital conversion;

shake detecting means for detecting a shake of the video camera;

calculating means for obtaining a correction amount from an output signal of the shake detecting means;

correcting means for correcting a shake of an image accompanied with a slight shake of a body of the video camera on the basis of an output signal of the calculating means;

zoom means for enlarging or reducing the object to be photographed; and control means for changing the correcting means in accordance with a change of zoom of the zoom means.

According to yet another object of the invention, there is provided video signal reproducing apparatus comprising:

an analog to digital converting circuit for converting an input video signal into a digital signal;

a memory circuit for storing the digital signal obtained by the analog to digital conversion;

shake detecting means for detecting a shake of an image plane generated by the video signal;

calculating means for obtaining a correction amount from an output signal of the shake detecting means;

correcting means for correcting a shake of an image accompanied with a slight shake of the image plane on the basis of an output signal of the calculating means;

zoom means for enlarging or reducing the object to be photographed; and control means for changing the correcting means in accordance with a change of zoom of the zoom means.

The shake of the video camera or the video signal reproducing apparatus is detected by the angular velocity sensor. The correction amount of the image is calculated from the detection result and the zoom magnification. In this instance, by using the electronic enlargement magnification, a coefficient of the low pass filter to convert from the angular velocity into the angle is changed. Thus, the correction amount in the electronic zoom region can be effectively used and the correction ability is improved.

According to the invention, by using a nonlinear limiter as a limiter to set the limit value of the control, it is prevented that the value suddenly reaches the correction limit upon panning and the image plane upon panning can be made natural.

According to the invention, the coefficient of the low pass filter which converts the angular velocity into the angle can be set in correspondence to the electronic zoom magnification. Therefore, as the electronic zoom magnification is increased, a larger correction range can be obtained, so that the hand shake correction ability is improved.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
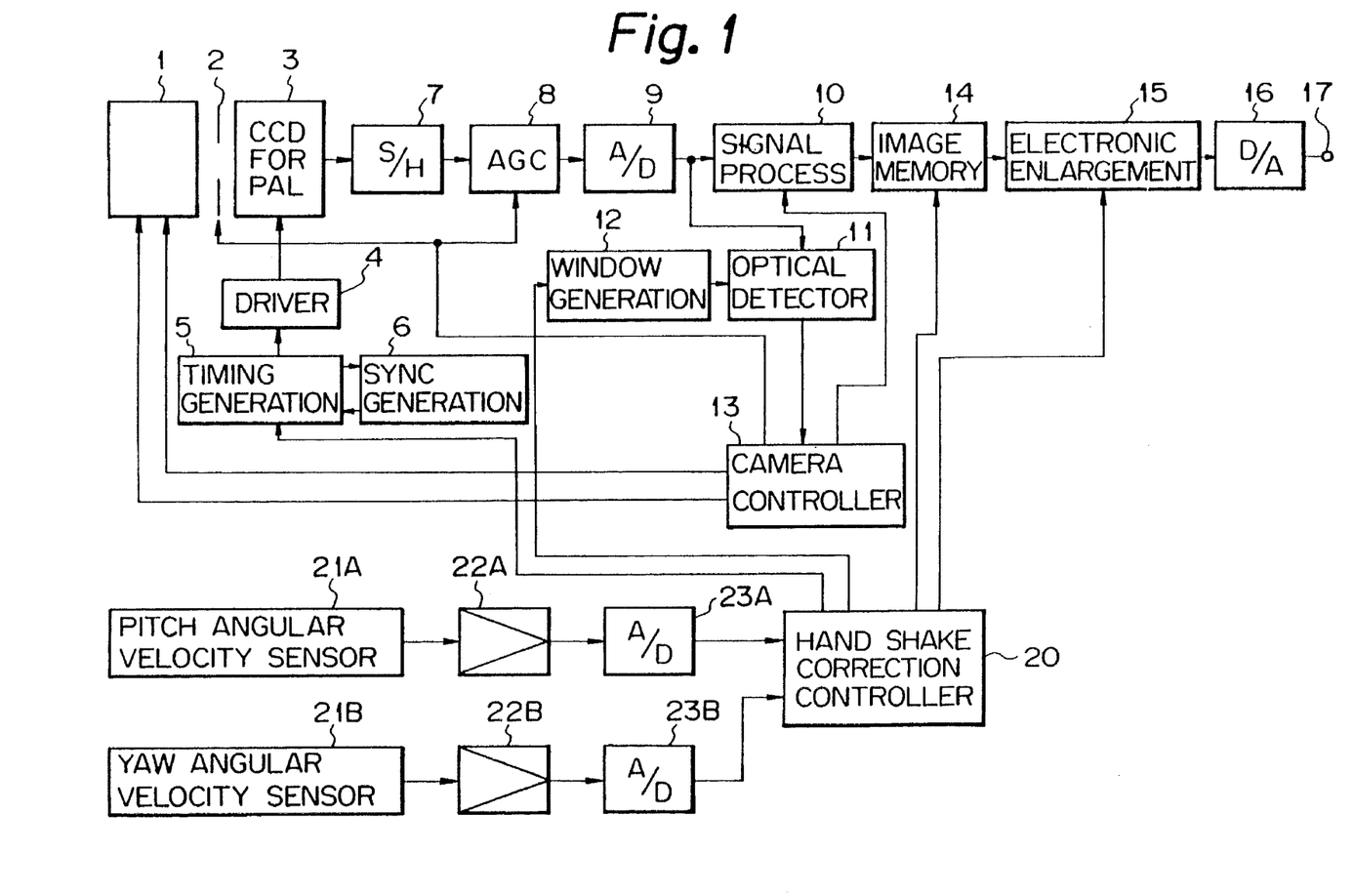
FIG. 1 is a block diagram showing a whole construction of a video camera to which the invention is applied.

An embodiment of the invention will be explained hereinbelow with reference to the drawings. FIG. 1 shows a whole construction of a video camera to which the invention is applied. In FIG. 1, an object image light obtained through a lens group 1 forms an image onto a photosensitive surface of a CCD image pickup device 3 through an iris 2. The video camera records by the NTSC system. In order to correct the hand shake, however, the number of lines of the CCD image pickup device 3 corresponds to the number of lines of the PAL system instead of the number of lines of the NTSC system.

The CCD image pickup device 3 is driven by a driver 4 on the basis of a timing signal from a timing generating circuit 5. A sync signal is supplied to the timing generating circuit 5 from a sync signal generating circuit 6. An output from a hand shake correction controller 20 is supplied to the timing generating circuit 5. A high speed transfer clock is supplied to the CCD image pickup device 3 within a vertical blanking period according to the shake in the vertical direction of the camera.

The output of the CCD image pickup device 3 is supplied to an A/D converter 9 through a sampling and holding circuit 7 and an AGC circuit 8. The image pickup signal is converted into the digital signal by the A/D converter 9. An output of the A/D converter 9 is supplied to a signal processing circuit 10 and also to an optical detector 11.

The signal processing circuit 10 executes a necessary camera signal process and forms a luminance signal and a chrominance signal which correspond to the NTSC system from the image pickup signal of the CCD image pickup device 3. An output of the signal processing circuit 10 is supplied to an image memory 14.

The optical detector 11 is provided to obtain information necessary for optical control such as exposure control, focusing control, white balance control, and the like. A window is set by the optical detector 11 and a light amount level in the window is detected. The light amount level is supplied to a camera controller 13.

The camera controller 13 controls a gain of the AGC circuit 8 and an opening degree of the iris 2 in accordance with the light amount level. Due to this, the automatic exposure control is executed. A window is set in the optical detector 11 and an edge component level of the image pickup signal in the window is detected. The edge component level is supplied to the camera controller 13. The camera controller 13 controls the position of the focusing lens in the lens group 1 so as to maximize the edge component. Due to this, the automatic focusing adjustment is executed.

The position of the window of the optical detector 11 is movable in the horizontal direction by a window generating circuit 12. The position of the window is changed in accordance with the hand shake correction amount.

The image memory 14 is provided for executing the electronic zoom and is also used for executing a hand shake correction of a big shake. An output of the image memory 14 is supplied to an electronic enlarging circuit 15. The electronic enlarging circuit 15 executes a hand shake correction in the horizontal direction of the camera by shifting the reading position of one line. The hand shake in the vertical direction of one line or less is also corrected by the electronic enlarging circuit 15.

An output of the electronic enlarging circuit 15 is supplied to a D/A converter 16. The D/A converter 16 outputs an analog video signal. The analog video signal is outputted from an output terminal 17.

The shake of the camera is detected by a pitch angular velocity sensor 21A and a yaw angular velocity sensor 21B. That is, the shake in the vertical direction is detected by the pitch angular velocity sensor 21A. An output of the pitch angular velocity sensor 21A is supplied to an A/D converter 23A through an amplifier 22A. An output of the A/D converter 23A is supplied to the hand shake correction controller 20. An output of the yaw angular velocity sensor 21B is supplied to an A/D converter 23B through an amplifier 22B. An output of the A/D converter 23B is supplied to the hand shake correction controller 20.

The hand shake correction controller 20 allows the CCD image pickup device 3 to transfer the charges at a high speed on the basis of the shake in the vertical direction detected by the pitch angular velocity sensor 21A, thereby executing the hand shake correction in the vertical direction. Shifting operation is executed in the horizontal direction on the basis of the shake in the horizontal direction detected by the yaw angular velocity sensor 21B. Due to this, the hand shake correction in the horizontal direction is executed.

Figure 2:
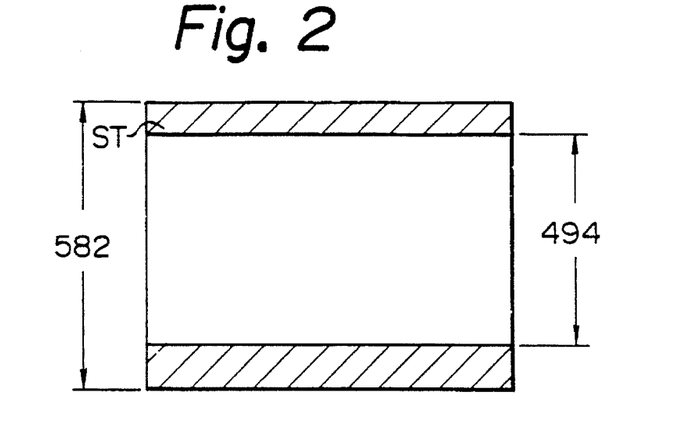
FIG. 2 is a schematic diagram which is used for explanation of an embodiment of the invention.

As shown in FIG. 2, according to the embodiment of the invention, a device having the number of lines of the PAL system, for example, the number of effective lines equal to 582 is used as a CCD image pickup device 3. On the other hand, the number of effective lines of the NTSC system is equal to 494. Therefore, 494 lines among the 582 effective lines of one image plane of the CCD image pickup device 3 are used. As shown in the hatched regions in FIG. 2, outputs of the other lines are not used. The image plane can be moved in the vertical direction by changing the start position ST. Therefore, by moving the start position ST so as to eliminate the shake in the vertical direction of the image plane, the hand shake correction in the vertical direction can be executed.

Figure 3:
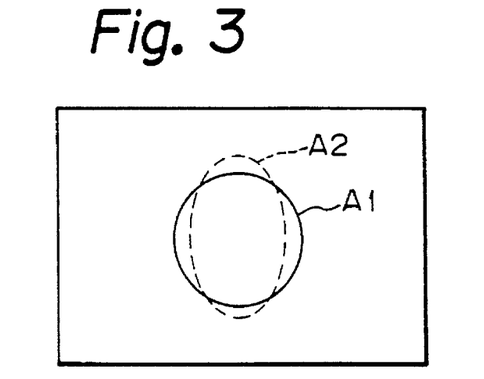
FIG. 3 is a schematic diagram which is used for explanation of a hand shake correction of an embodiment of the invention.

Accordingly, when the charges of the lines as many as the number of lines in the NTSC system in the CCD image pickup device 3 having the lines as many as the number of lines of the PAL system are transferred at an ordinary speed, and the charges of the remaining lines are transferred at a high speed, as shown in FIG. 3, for example, a circular object A1 is displayed as a circular object A2 which is elongated vertically.

Figure 4A:
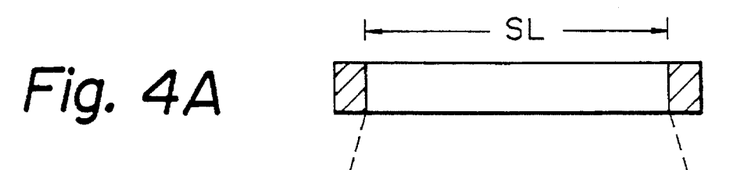
FIGS. 4A and 4B are schematic diagrams which are used for explanation of a hand shake correction of an embodiment of the invention.
Figure 4B:
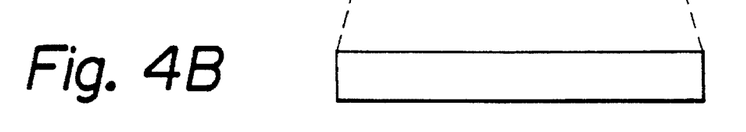

As shown in FIG. 4A, a signal SL of one line is fetched into the line memory and as shown in FIG. 4B, the signal is read out while changing the time base. Thus, an aspect ratio of the image which is displayed is corrected and also the image plane in the horizontal direction is enlarged. The reading position in the line memory is shifted in accordance with the shake of the video camera in the horizontal direction, thereby enabling the hand shake correction in the horizontal direction to be executed.

Figure 5A:
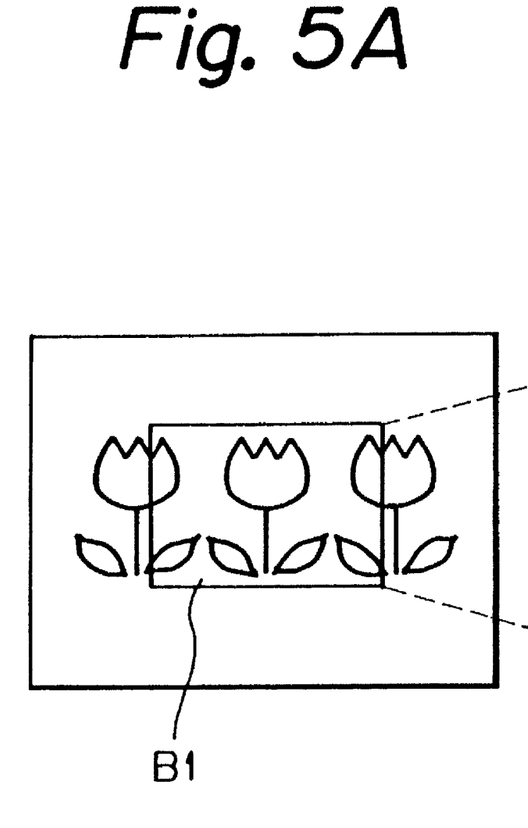
FIGS. 5A and 5B are schematic diagrams which are used for explanation of an electronic zoom of an embodiment of the invention.
Figure 5B:
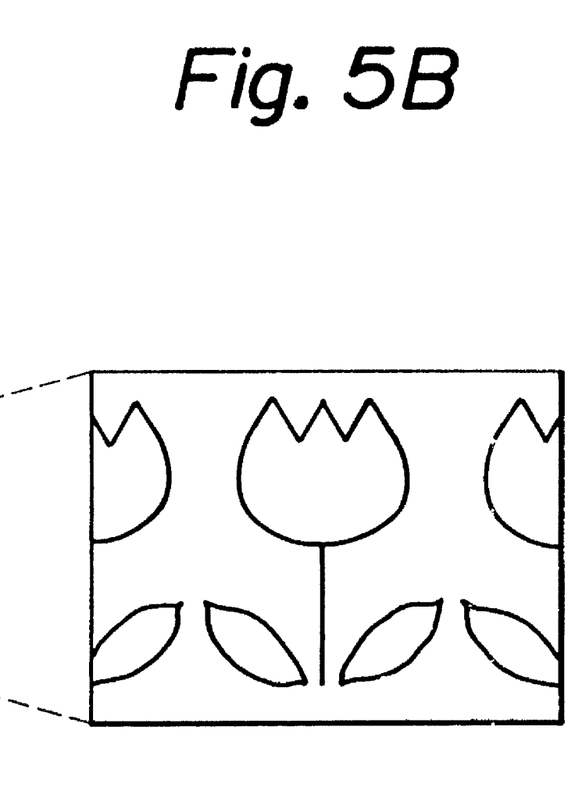

In the video camera to which the invention is applied, by moving the zoom lens, the optical zoom photographing can be executed and by using the image memory 14, the electronic zoom photographing can be also executed. That is, when it is assumed that the image pickup plane as shown in FIG. 5A has been stored in the image memory 14, by cutting out the portion shown by the region B1 and by enlargedly interpolating the cut-out portion, the image plane can be doubled in size as shown in FIG. 5B.

The hand shake correction controller 20 executes a filtering process to the outputs of the pitch angular velocity sensor 21A and the yaw angular velocity sensor 21B, thereby calculating correction amounts in the vertical and horizontal directions.

Figure 6:
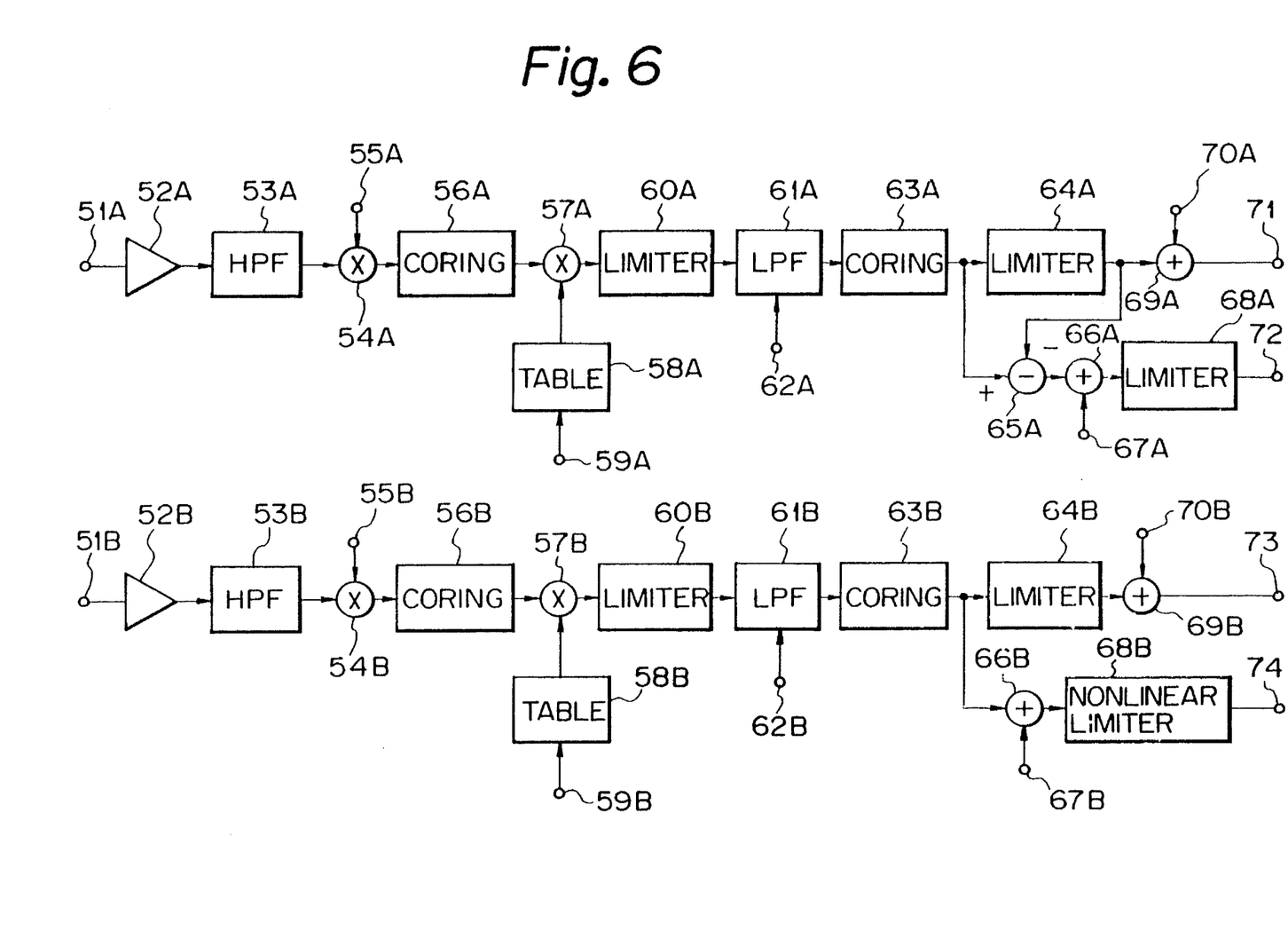
FIG. 6 is a functional block diagram of a hand shake correction controller of an embodiment of the invention.

FIG. 6 is a functional block diagram of the processes in the hand shake correction controller 20. First, the process on the pitch side will be explained. In FIG. 6, an output of the angular velocity sensor 21A in the pitch direction is supplied to an input terminal 51A through the amplifier 22A and the A/D converter 23A (FIG. 1). A signal from the input terminal 51A is supplied to a high pass filter 53A through a multiplying circuit 52A for an adjustment of the whole gain. The high pass filter 53A eliminates a DC offset included in the angular velocity sensor 21A.

An output of the high pass filter 53A is supplied to a multiplying circuit 54A for a variation adjustment of the angular velocity sensor. A gain corresponding to a variation is supplied to the multiplying circuit 54A from an input terminal 55A. An output of the multiplying circuit 54A is supplied to a coring circuit 56A for noise removal. An output of the coring circuit 56A is supplied to a multiplying circuit 57A.

A coefficient is given to the multiplying circuit 57A from a table 58A. A position of an optical zoom is given to the table 58A from a terminal 59A. The hand shake needs to be largely corrected as the optical zoom magnification is large. Accordingly, the coefficient is set by the table 58A so that a bigger correction is executed when the zoom lens is located on the telescopic side.

An output of the multiplying circuit 57A is supplied to a low pass filter 61A through a limiter 60A. The low pass filter 61A executes a conversion from an angular velocity to an angle. The low pass filter 61A is constructed by an IIR filter as will be described in detail hereinlater. A coefficient in the low pass filter 61A is set in accordance with the electronic zoom magnification from a terminal 62A, thereby enabling the effective correction to be also executed even in the electronic zoom region.

An output of the low pass filter 61A is supplied to a coring circuit 63A. An output of the coring circuit 63A is supplied to a limiter 64A. An output of the limiter 64A is outputted from an output terminal 71 through an offset adding circuit 69A and is also supplied to a subtracting circuit 65A. According to an output from the output terminal 71, the reading position of the CCD image pickup device 3 for the PAL is shifted and the hand shake correction in the vertical direction is executed.

A correction amount exceeding an offset is obtained by the subtracting circuit 65A. An output of the subtracting circuit 65A is supplied to an adding circuit 66A. An electronic zoom control data is supplied to the adding circuit 66A from a terminal 67A. An output of the adding circuit 66A is outputted from an output terminal 72 through a limiter 68A. According to the output from the output terminal 72, the reading position in the image memory 14 is shifted and the hand shake correction in the vertical direction exceeding the correction range is executed. An output of the output terminal 72 is supplied to the electronic enlarging circuit 15 and the hand shake correction in the vertical direction of 0.5 line or less is executed.

The process in the yaw direction will now be explained. The process in the yaw direction is substantially the same as the process in the pitch direction. That is, the output of the angular velocity sensor 21 in the yaw direction is supplied to an input terminal 51B through the amplifier 22B and the A/D converter 23B. The signal from the input terminal 51B is supplied to a high pass filter 53B for a DC offset removal through a multiplying circuit 52B for an adjustment of the whole gain.

An output of the high pass filter 53B is supplied to a multiplying circuit 54B for a variation adjustment of the angular velocity sensor. A gain corresponding to the variation is supplied to the multiplying circuit 54B from an input terminal 55B. An output of the multiplying circuit 54B is supplied to a coring circuit 56B for a noise removal. An output of the coring circuit 56B is supplied to a multiplying circuit 57B. A coefficient is given to the multiplying circuit 57B from a table 58B. The position of the optical zoom is given to the table 58B from a terminal 59B. The coefficient is set by the multiplying circuit 57B and the table 58B so that bigger correction is executed when the zoom lens is located on the telescopic side.

An output of the multiplying circuit 57B is supplied to a low pass filter 61B through a limiter 60B. The low pass filter 61B converts the angular velocity into the angle. An electronic zoom magnification is supplied to the low pass filter 61B from a terminal 62B. An output of the low pass filter 61B is supplied to a coring circuit 63B. An output of the coring circuit 63B is supplied to a limiter 64B. An output of the limiter 64B is outputted from an output terminal 73 through an offset adding circuit 69B and is also supplied to an adding circuit 66B. An offset is supplied to the adding circuit 69B from a terminal 70B. Electronic zoom control data is supplied to the adding circuit 66B from a terminal 67B. An output of the adding circuit 66B is outputted from an output terminal 74 through a nonlinear limiter 68B.

An output from the output terminal 73 is supplied to the window generating circuit 12 and the window position of the optical detector 11 is shifted in accordance with the output from the output terminal 73. An output of the output terminal 74 is supplied to the electronic enlarging circuit 15 and the reading position of the electronic enlarging circuit 15 is shifted in accordance with an output from the output terminal 74 and the hand shake correction in the horizontal direction is executed.

As mentioned above, the low pass filters 61A and 61B convert from the angular velocity to the angle and obtain a correction amount. In order to set a limit of the correction amount, limiters 64A, 68A, 64B, and 68B are provided. Among these limiters, the limiter 68B is a nonlinear limiter so as to prevent that an image pickup plane becomes unnatural upon panning photographing.

Namely, upon panning photographing, since the camera is rapidly moved at the start of the panning, the integration value of the angular velocity sensor rapidly increases and suddenly exceeds the limit value. Therefore, when an ordinary limiter is used, the integration value suddenly reaches the correction limit from a state of the image plane such that the motion of the panning is suppressed at the start of the panning. An unnatural image pickup plane is obtained.

Figure 7:
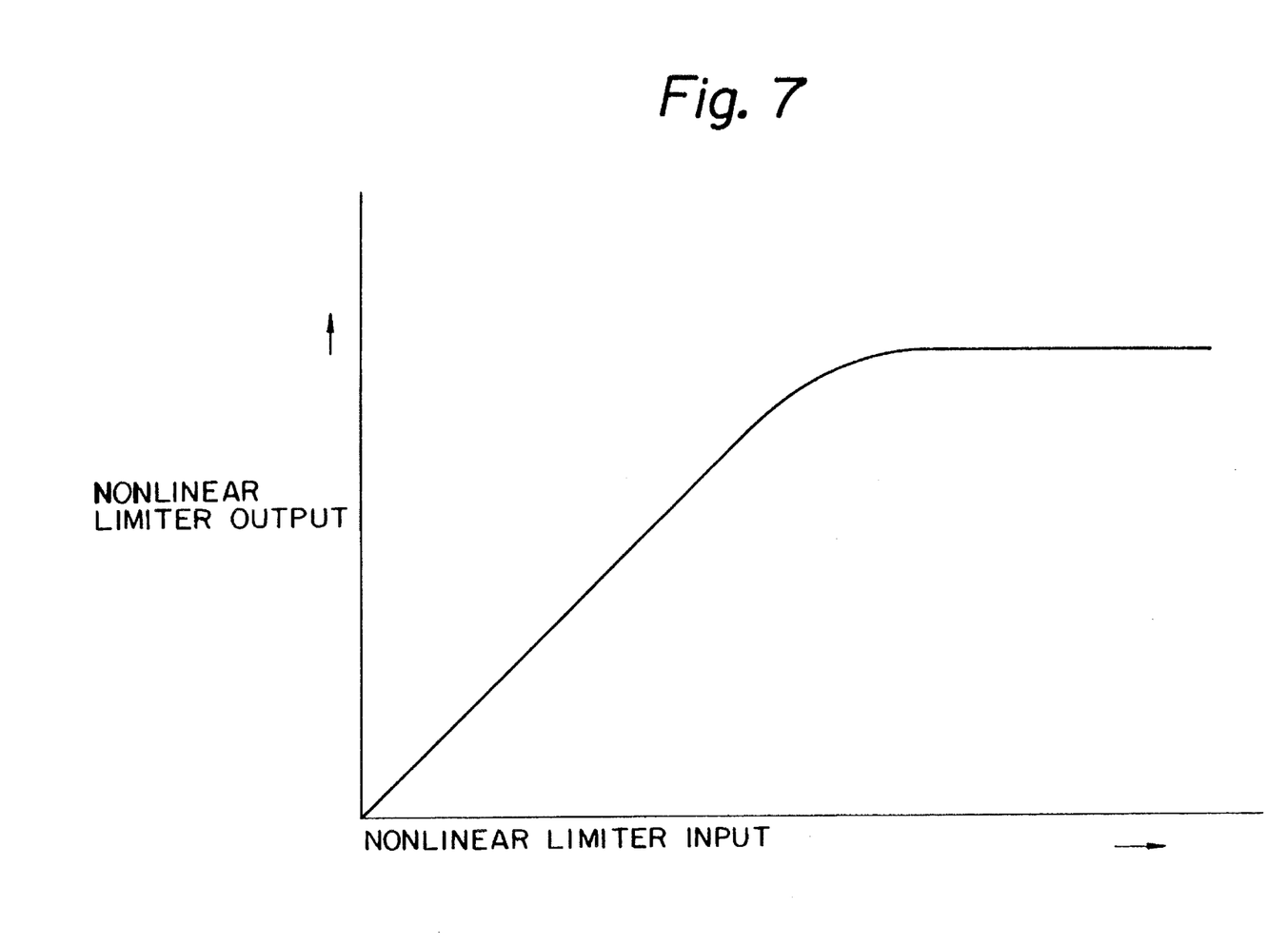
FIG. 7 is a graph showing an example of a table of a nonlinear limiter in an embodiment of the invention.

On the other hand, according to an embodiment of the invention, as shown in FIG. 7, a nonlinear limiter such that the correction amount gradually approaches the limit is used. FIG. 7 shows a table of a nonlinear limiter 68B. In FIG. 7, an axis of abscissa shows input values of the nonlinear limiter 68B and an axis of ordinate indicates output values. The input corresponds to the output of the low pass filter 61B.

As mentioned above, according to the embodiment of the invention, since the nonlinear limiter 68B is used, even when the camera is rapidly moved at the start of the panning, the value doesn't suddenly reach the correction limit and the image pickup plane upon panning is not unnatural.

Figure 8A:
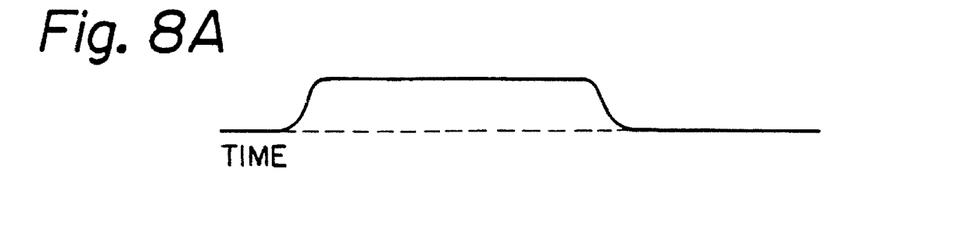
FIGS. 8A, 8B, and 8C are waveform diagrams which are used for explanation of an embodiment of the invention.
Figure 8B:
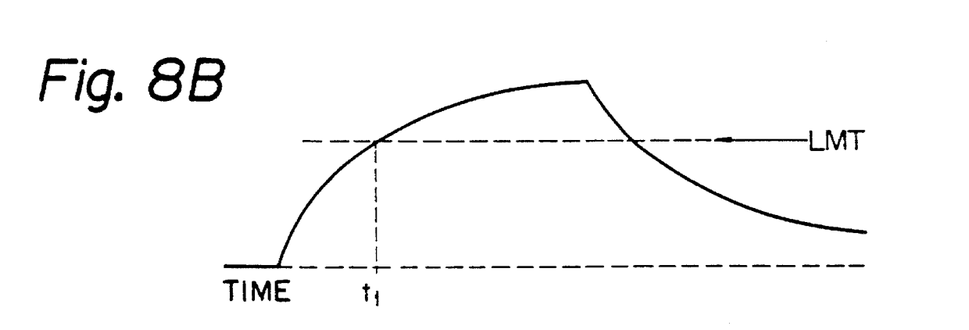
Figure 8C:
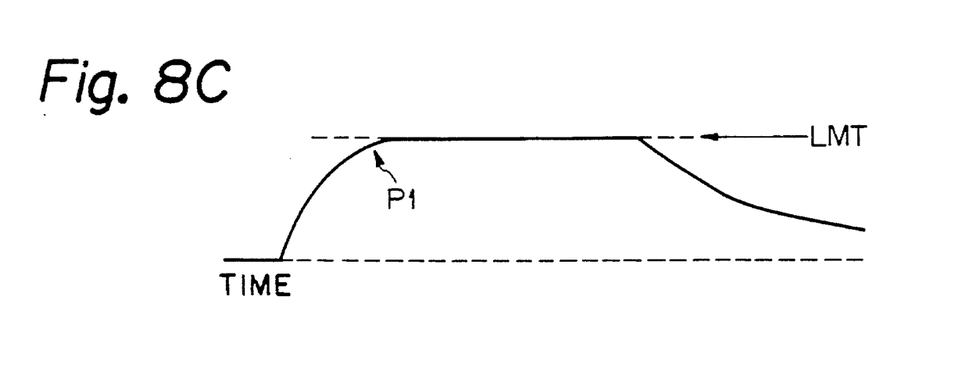

Namely, when the panning photographing is executed, a detection signal as shown in FIG. 8A is outputted from the angular velocity sensor. The detection signal is integrated by the low pass filter. The integration value reaches the correction limit LMT at a time point $t_1$ as shown in FIG. 8B. Since the characteristics of the nonlinear limiter 68B are nonlinear, as shown at a point P1 in FIG. 8C, the value gradually reaches the correction limit LMT. Due to this, the image pickup plane upon panning is not unnatural.

Although the characteristics of the nonlinear limiter 68B can be fixed, the nonlinear characteristics can be also changed according to the speed of the panning or the zoom ratio. For instance, limiter characteristics such that the faster the panning speed is, or the bigger the zoom magnification is, the curve which reaches the correction limit becomes more gentle are set.

According to the embodiment mentioned above, a nonlinear limiter is provided only for a hand shake correction system in the horizontal direction. However, it is also possible to provide a nonlinear limiter for a hand shake correction system in the vertical direction.

Figure 9A:
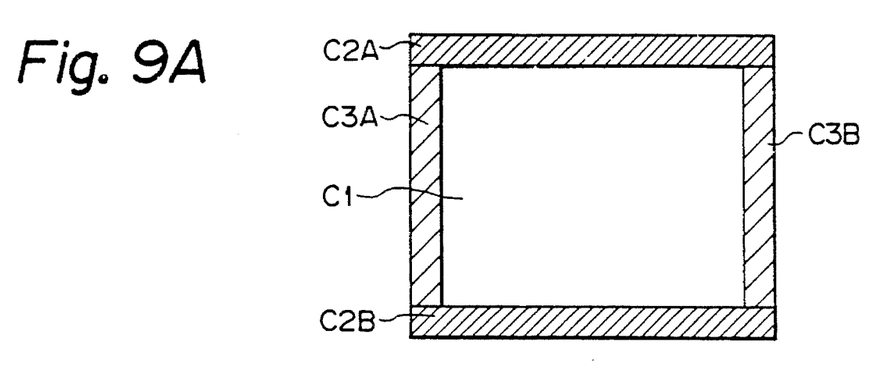
FIGS. 9A and 9B are schematic diagrams which are used for explanation of a hand shake correction of an embodiment of the invention.

FIG. 9A shows an image plane in the optical zoom region. In such an optical zoom region, an image of the region shown by C1 is used. The hand shake correction in the vertical direction is executed within a region shown by C2A and C2B and the hand shake correction in the horizontal direction within a region shown by C3A and C3B is executed. The hand shake correction in the range shown by C2A and C2B is achieved by shifting the reading position of the CCD image pickup device 3. The hand shake correction in the horizontal direction in the range shown by C3A and C3B is achieved by shifting the reading position in the horizontal direction by the electronic enlarging circuit 15.

Figure 9B:
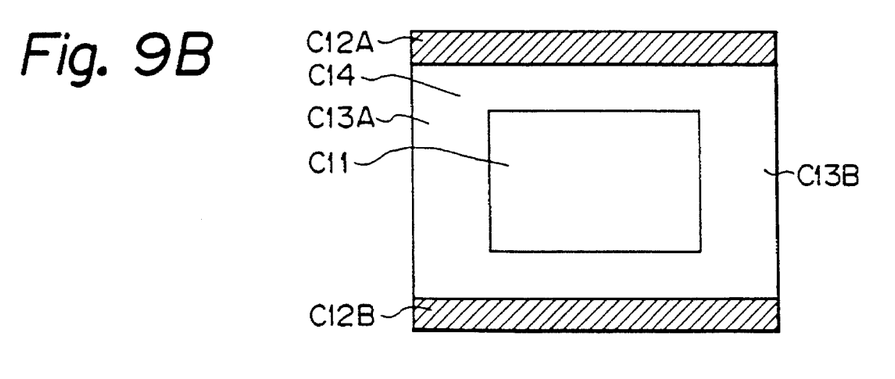

FIG. 9B shows an image plane which is stored in the image memory 14 in the electronic zoom region. In such an electronic zoom region, an image in the region shown by C11 is used. The hand shake correction in the vertical direction is executed by shifting the reading position of the CCD image pickup device 3 within a range shown by C12A and C12B. The hand shake correction in the horizontal direction is executed within a range shown by C13A and C13B. Further, an unused region C14 occurs in the image memory. The unused region C14 can be used for the hand shake correction.

Figure 10:
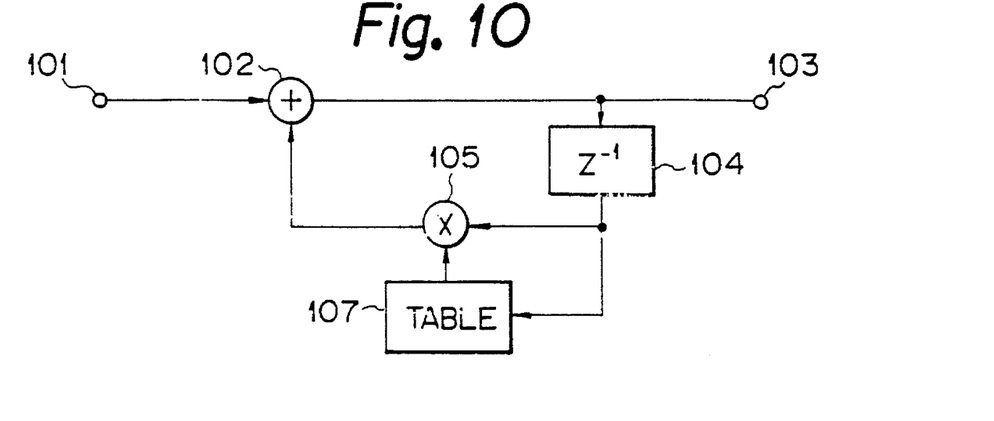
FIG. 10 is a block diagram which is used for explanation of a low pass filter of an embodiment of the invention.
Figure 11:
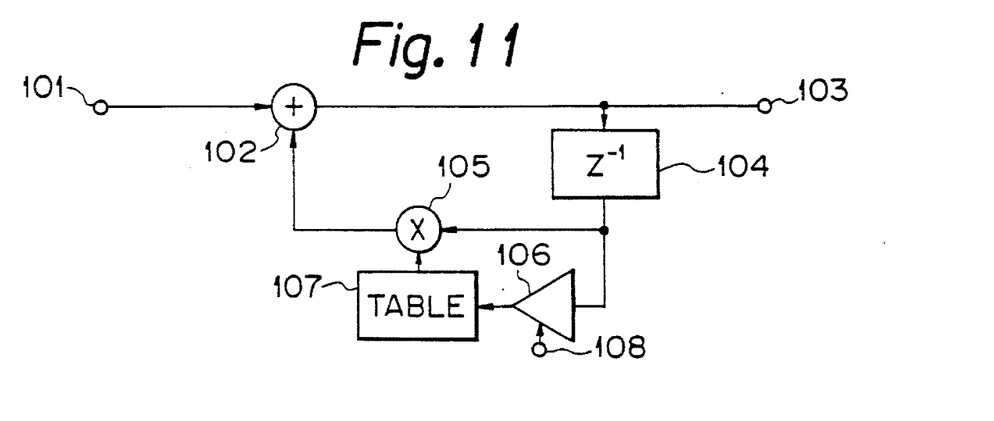
FIG. 11 is a block diagram which is used for explanation of a low pass filter of an embodiment of the invention.

FIGS. 10 and 11 show constructions of the low pass filters 61A and 61B. FIG. 10 shows a construction in the optical zoom region and FIG. 11 shows a construction in the electronic zoom region. In FIGS. 10 and 11, a signal from an input terminal 101 is supplied to an adding circuit 102. An output of the adding circuit 102 is outputted from an output terminal 103 and is also supplied to a delay circuit 104.

In the optical zoom region, as shown in FIG. 10, an output of the delay circuit 104 is supplied to a multiplying circuit 105 and also to a table 107. A coefficient is read out by the table 107 and the coefficient is set to the multiplying circuit 105. An output of the multiplying circuit 105 is supplied to the adding circuit 102.

In the electronic zoom region, as shown in FIG. 11, an output of the delay circuit 104 is supplied to the multiplying circuit 105 and also to an attenuator 106. An electronic zoom magnification (k) is supplied to the attenuator 106 from an input terminal 108. A coefficient is read out by the table 107 and the coefficient is set to the multiplying circuit 105. An output of the multiplying circuit 105 is supplied to the adding circuit 102.

A signal corresponding to the shake of the video camera is supplied to the input terminal 101. And the signal is added to the feedback component by the adding circuit 102 and outputted and is also multiplied with a proper coefficient by the multiplying circuit 105 and is fed back.

The coefficient is obtained by referring to the table 107 by the output of the delay circuit 104 in the optical zoom region as shown in FIG. 10. In the electronic zoom region, as shown in FIG. 11, the coefficient is obtained by supplying the output of the delay circuit 104 to the table 107 through the attenuator 106 and by referring to the table 107. An attenuation of the attenuator 106 is set so as to be inversely proportional to the electronic zoom magnification (k).

Figure 12:
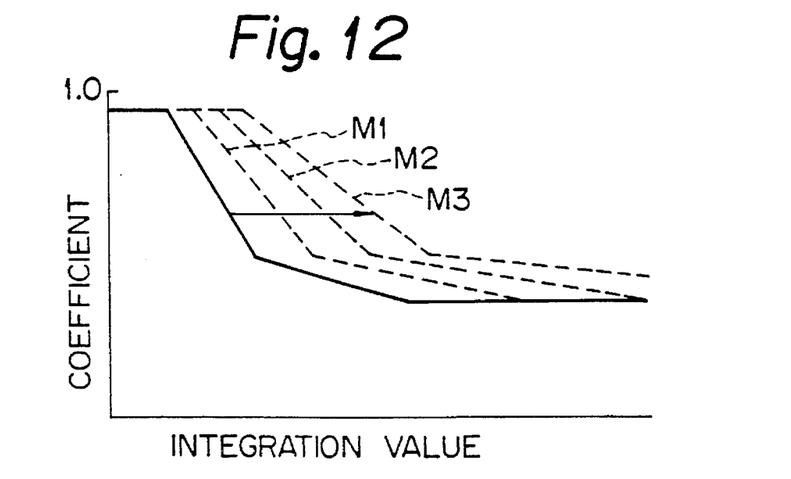
FIG. 12 is a graph which is used for explanation of a low pass filter of an embodiment of the invention.

FIG. 12 shows the relation between the integration value in the electronic zoom region and the coefficient. In FIG. 12, an axis of abscissa shows the integration value and an axis of ordinate shows the coefficient. Since the attenuation of the attenuator 106 is set so as to be inversely proportional to the electronic zoom magnification (k), as the electronic zoom magnification is raised, the line showing the relation between the integration value and the coefficient is changed such that M1, M2, M3, . . . . Therefore, as the electronic zoom magnification increases, the correction range can be largely set.

The invention is not limited to the video camera but can be also similarly used in a video reproducing apparatus having a hand shake correcting function. Namely, the shake of the image plane due to the hand shake not only can be corrected on the video camera side upon recording, but also can be corrected on the reproducing apparatus side upon reproduction. That is, upon reproduction, the hand shake is detected, and the image plane is shifted according to the hand shake amount. Thus, in case of executing the hand shake correction upon reproduction, the hand shake can be detected by detecting the motion vector of the reproduction video signal. A low pass filter is used for obtaining an actual correction amount from the motion vector.

In such a video reproducing apparatus, a nonlinear limiter can be used in a manner similar to the embodiment mentioned above.

The invention is not limited to a video camera but can be also applied to a video signal reproducing apparatus having the hand shake correction function. Namely, the shake of the image plane by a hand shake can be corrected not only by executing the correction on the video camera side upon recording but also on the reproducing apparatus side upon reproduction. That is, the hand shake is detected upon reproduction and the image plane is shifted according to the hand shake amount. Thus, in case of executing the hand shake correction upon reproduction, the hand shake is detected by detecting the motion vector of the reproduction video signal. A low pass filter is used in order to obtain an actual correction amount from the motion vector. An image memory is used to execute the correction. An electronic enlarging image plane can be formed by using the image memory. In case of forming an electronic enlarging image plane as mentioned above, by changing the coefficient of the low pass filter according to the magnification, a wide correction range can be obtained.

What is claimed is:

1. A video camera comprising:

lens means for collecting light from an object to be photographed;

an image pickup device for converting the light collected by said lens means into an electric signal;

an analog to digital converting circuit for converting the electric signal from said image pickup device into a digital signal;

a memory circuit for storing the digital signal produced by said analog to digital converting circuit;

shake detecting means for detecting a shake of the video camera;

calculating means for obtaining a correction amount from an output signal of said shake detecting means and for generating an optical control signal and an electronic control signal;

optical correcting means responsive to said optical control signal for correcting a shake of an image caused by the shake of the video camera up to a predetermined limit;

optical zoom means included in said lens means for enlarging or reducing the object to be photographed; and electronic zoom means for enlarging or reducing the object to be photographed represented by said digital signal from said analog to digital converting circuit and for correcting a portion of the shake that exceeds the predetermined limit in response to said electronic control signal.

2. The video camera according to claim 1, wherein said optical zoom means comprises a lens and said electronic zoom means performs an electrical process on signals output from said memory circuit.

3. The video camera according to claim 1, wherein said optical zoom means and said electronic zoom means are controlled so that said optical zoom means executes a zooming operation first and said electronic zoom means executes a zooming operation when a zoom amount by said optical zoom means reaches a maximum zoom.

4. The video camera according to claim 1, wherein a window for a predetermined focus adjustment is set in said image pickup device and the window is moved in response to operation of said optical zoom means.

5. The video camera according to claim 1, wherein the output of said memory circuit is supplied to said electronic zoom means for performing hand shake correction.

6. The video camera according to claim 1, wherein said electronic zoom means performs a hand shake correction in the horizontal direction by shifting a read-out position in one line of said memory circuit.

7. The video camera according to claim 1, wherein said image pickup device has an image pickup area larger than an image display area, and said optical correcting means performs a hand shake correction in the horizontal and vertical directions by changing a read-out position in the horizontal and vertical directions in the image pickup area.

8. The video camera according to claim 1, wherein said shake detecting means comprises angular sensors which detect motion of the video camera in the vertical and horizontal directions.

9. The video camera according to claim 8, wherein said calculating means comprises a gain adjusting circuit for performing a negative adjustment of gain for output signals obtained from said angular sensors.

10. The video camera according to claim 9, wherein said gain adjusting circuit comprises a multiplying circuit for adjusting a variation in the output of said angular sensors.

11. The video camera according to claim 10, wherein said gain adjusting circuit further comprises a coring circuit for eliminating noise in an output signal of said multiplying circuit.

12. The video camera according to claim 11, wherein said gain adjusting circuit further comprises a low pass filter circuit for converting angular velocity information of an output signal of said coring circuit into angular information.

13. The video camera according to claim 12, wherein said gain adjusting circuit further comprises a limiter circuit for limiting an amplitude of an output signal of said low pass filter.

14. A video camera comprising:

lens means for collecting light from an object to be photographed;

an image pickup device for converting the light collected by said lens means into an electric signal;

an analog to digital converting circuit for converting the electric signal from said image pickup device into a digital signal;

a memory circuit for storing the digital signal produced by said analog to digital converting circuit;

shake detecting means for detecting a shake of the video camera;

calculating means for obtaining a correction amount from an output signal of said shake detecting means and for generating an optical control signal and an electronic control signal;

optical correcting means responsive to said optical control signal for correcting a shake of an image caused by the shake of the video camera up to a predetermined limit;

optical zoom means included in said lens means for enlarging or reducing the object to be photographed; and electronic zoom means for enlarging or reducing the object to be photographed and for correcting a portion of the shake that exceeds the predetermined limit in response to said electronic control signal;

wherein said calculating means comprises a first limiter circuit that limits the correction amount in accordance with the predetermined limit.

15. The video camera according to claim 14, wherein said first limiter circuit performs a nonlinear process for changing a limiting amount.

16. The video camera according to claim 14, wherein said shake detecting means generates a panning speed signal that controls said first limiter circuit so that the limiting amount is changed in response thereto.

17. The video camera according to claim 14, wherein said first limiter circuit is controlled so that the limiting amount is changed in response to zoom amounts of said optical and electronic zoom means.

18. The video camera according to claim 17, wherein said electronic zoom means performs an electrical process on signals output from said memory circuit.

19. The video camera according to claim 18, wherein said zoom means is controlled so that said optical zoom operates first and said electronic zoom operates when a zoom amount by said optical zoom reaches its maximum.

20. The video camera according to claim 14, wherein a window for a predetermined focus adjustment is set in said image pickup device and the window is moved in response to operation of said optical zoom means.

21. The video camera according to claim 18, wherein the output of said memory circuit is supplied to said electronic zoom means for performing hand shake correction.

22. The video camera according to claim 18, wherein said electronic zoom means performs a hand shake correction operation in the horizontal direction by shifting a read-out position in one line of said memory circuit.

23. The video camera according to claim 18, wherein said image pickup device has an image pickup area larger than an image display area, and said optical correction means performs a hand shake correction in the horizontal and vertical directions by changing a read-out position in the horizontal and vertical directions in the image pickup area.

24. The video camera according to claim 14, wherein said shake detecting means comprises angular sensors which detect motion of the video camera in the vertical and horizontal directions.

25. The video camera according to claim 24, wherein said calculating means comprises a gain adjusting circuit for performing a negative adjustment of gain for output signals obtained from said angular sensors.

26. The video camera according to claim 25, wherein said gain adjusting circuit comprises a multiplying circuit for adjusting a variation in the output of said angular sensors.

27. The video camera according to claim 26, wherein said gain adjusting circuit further comprises a coring circuit for eliminating noise in an output signal of said multiplying circuit.

28. The video camera according to claim 27, wherein said gain adjusting circuit further comprises a low pass filter circuit for converting angular velocity information of an output signal of said coring circuit into angular information.

29. The video camera according to claim 28, wherein said gain adjusting circuit further comprises a second limiter circuit for limiting an amplitude of an output signal of said low pass filter.

* * * * *